July 19, 1955 J. R. WEST 2,713,241
REEL TINE ASSEMBLY
Filed Sept. 11, 1953
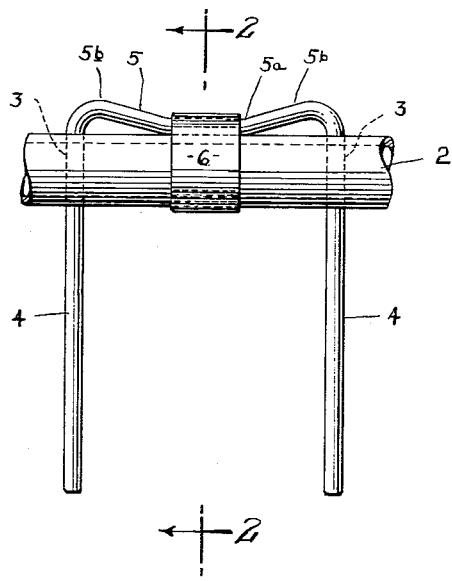
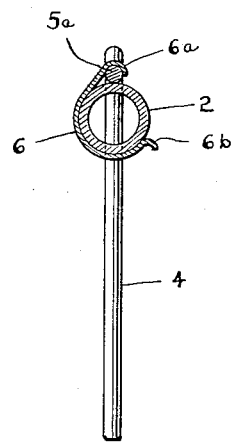
INVENTOR
James R. West
By Richard E. Babcock Jr.
ATTORNEY

United States Patent Office 2,713,241
Patented July 19, 1955

2,713,241

REEL TINE ASSEMBLY

James R. West, New Holland, Pa., assignor to The Sperry Corporation, New Holland, Pa., a corporation of Delaware Application September 11, 1953, Serial No. 379,677

7 Claims. (Cl. 56—400)

This invention relates to a harvester reel tine assembly.

It is the primary object of the invention to provide an extremely simple, rapid, and efficient means for assembling the tines of a harvester reel, hay rake or the like on the usual reel bars of the rotary reel.

To this end I provide a novel combination between the reel bar and tines, and a rapidly removable and replaceable spring clip, in which the spring clip resiliently engages and retains the reel bar and tines in operative relationship and is swingably supported on the tines for movement to operative or inoperative positions as required either to secure the tines on or release them from the bars. While the clips are swingably supported on the tines or portions thereof, they are easily and quickly manually disassociated therefrom and require no permanent connection thereto.

Such an assembly of parts permits a considerably more rapid and efficient replacement of individual tines or pairs of tines than is now possible with conventional such assemblies and similarly permits considerably more rapid assembly of the complete reels than has heretofore been possible.

The preferred embodiment of the invention is illustrated in the accompanying drawings in which:

Figure 1 represents a front elevation of a portion of a reel bar having a set or pair of rake tines secured thereon on accordance with the invention; and Figure 2, a section on the line 2—2 of Figure 1 looking in the direction of the arrows.

Referring now to detail to the accompanying drawings, the reference character 2 designates a portion or section of one of the reel bars of a conventional harvester reel of the class in which a plurality of such bars 2 are mounted in parallel relationship on a common reel structure for rotation about an axis parallel to said bars 2, as will be readily understood by those skilled in the art.

Each of the bars 2 is of circular cross-section and preferably of tubular construction as shown, being formed with pairs of relatively longitudinally spaced diametrical bores 3—3 therethrough, through which are inserted the free ends of interconnected tines 4—4. As is usual such tines are formed of material of round cross-section and in the preferred embodiment illustrated, the tines 4—4 of each pair are connected at their inner ends by a preferably integral retainer or bridge portion 5 similarly of circular cross-section. The medial section 5a of this retainer portion 5 extends parallel to the longitudinal axis of the reel bar 2 and is brought into contiguous relationship with the reel bar 2 as shown.

Suitably coupled to this round medial section 5a for swinging movement therearound is a sheet metal spring clip 6 of arcuate conformation extending circumferentially from the section 5a over half way around the bar 2 and of course between the tines 4—4. This clip 6 is formed to a curvature which is about a radius smaller than that of the bar 6 so that when resiliently expanded by application to the bar, 2 as shown, the clip 6 will resiliently draw the retainer portion 5 against the bar and will thus prevent endwise inward retractive movement of the tines 4—4 through the bar 2.

The swingable coupling or connection between the clip 6 and the retainer section 5a is preferably accomplished by bending one circumferential extremity of the clip 6 to form a hook which opens radially inwardly and thus defining an inwardly opening recess as at 6a for rotatably receiving the section 5a. In order to assemble a set of tines 4—4 to the reel bar 2, the tines are first inserted through the bores 3—3 in the reel bar and the hooked or recessed portion 6a of the clip is placed over the rounded section 5a with the open side of the clip directed generally toward the bar 2, whereupon the medial section 5a of the retainer portion is brought flush against bar 2 and the clip is swung downwardly about the retainer section 5a and is thus manually forced toward and around the bar 2 until it conformingly seats thereon as shown in Figures 1 and 2.

It will be seen that the free circumferential end of the clip 6 is formed with a radially outwardly projecting cam lip 6b to engage said bar 2 and resiliently expand the clip for reception of the bar when it is pressed thereonto.

In order to prevent undue longitudinal displacement of the clip 6 toward either of the tines 4, it is desirable to form the connector or retainer portion with sections 5b on either side of the medial section 5a diverging in opposite directions away from the bar 2 and thus cooperating with the opposite longitudinally directed edges of the clip 6 to prevent longitudinal displacement of the latter. Such arrangement also permits the juncture between each of the tines 4 and portion 5 to assume the form of a rather gentle curve rather than an abrupt right angular bend as would be necessitated should the connecting portion 5 lie flush against the bar 2 for its full extent.

While I prefer to employ the clips 6 of the invention in conjunction with tines arranged in pairs 4—4 as shown, this is of course not essential and obviously either of the tines 4 illustrated may be omitted, and the clip 6 employed in conjunction with the remaining tine and its associated portion 5.

Having thus described my invention, I claim:

1. A harvester reel tine assembly comprising a reel bar of circular cross-section having relatively spaced diametrical bores therethrough, a pair of tines disposed through said bores, a retainer portion of circular cross-section connecting the inner ends of said tines and including a section parallel to said bar, in combination with a spring clip of arcuate conformation coupled to said section for swinging movement therearound, the clip extending circumferentially from said coupling over halfway around the bar between said tines and being curved about a radius smaller than that of the bar to resiliently draw the retainer portion thereagainst.

2. The combination of claim 1 in which the free circumferential extremity of said clip is formed with a radially outwardly projecting cam lip to engage said bar and resiliently expand said clip for reception of the bar when pressed onto the bar.

3. A harvester reel tine assembly comprising a reel bar of circular cross-section having relatively spaced diametrical bores therethrough, a pair of tines disposed through said bores, a retainer portion of circular cross-section connecting the inner ends of said tines and including a section parallel to said bar, in combination with a spring clip of arcuate conformation having an inwardly opening hook at one circumferential extremity journalled on said section and swingably supporting the clip for movement around said section, the clip extending circumferentially from said hook over half way around the bar between said tines and being curved about a radius smaller than that of the bar to resiliently draw the retainer portion thereagainst.

4. The combination of claim 1 in which sections of said retainer portion on either side of the clip diverge in opposite directions away from said bar to prevent longitudinal movement of the clip.

5. A harvester reel tine assembly comprising a reel bar having relatively longitudinally spaced parallel bores extending transversely therethrough, a pair of tines respectively disposed through said bores, and a retainer portion of circular cross-section interconnecting said tines, in combination with a spring clip of generally arcuate conformation coupled to said portion for swinging movement about an axis parallel to said bar for movement into and out of operative engagement with said bar, said clip when in operative engagement with the bar extending more than half way therearound, the normal internal dimensions of said clip being less than the thickness of said bar in the plane of said bores, whereby said clip will resiliently draw said retainer portion against the bar.

6. A harvester reel tine assembly comprising a reel bar of circular cross-section having a diametrical bore therethrough, a tine disposed through said bore, a retainer portion of circular cross-section extending from one end of said tine generally parallel and contiguous to said bar, a spring clip of arcuate conformation coupled to said portion for swinging movement therearound, the clip extending from said portion over half way around said bar and being curved about a radius smaller than that of the bar to resiliently draw the retainer portion against the bar.

7. The combination of claim 6 in which the free circumferential extremity of said clip is formed with a radially outwardly projecting cam lip to engage the bar and resiliently expand said clip for reception of the bar when pressed thereonto.

References Cited in the file of this patent

UNITED STATES PATENTS

| | | |
|---|---|---|
| 265,820 | Johnston | Oct. 10, 1882 |
| 1,652,260 | Thompson | Dec. 13, 1927 |
| 1,861,151 | Buschman | May 31, 1932 |
| 2,237,002 | Kelley | Apr. 1, 1941 |